(12) United States Patent
Bhatia et al.

(10) Patent No.: US 10,475,456 B1
(45) Date of Patent: Nov. 12, 2019

(54) SMART CODING MODE SWITCHING IN AUDIO RATE ADAPTATION

(71) Applicant: QUALCOMM Incorporated, San Diego, CA (US)

(72) Inventors: Sarandeep Bhatia, San Diego, CA (US); Tony Lee, San Diego, CA (US); Shyamal Ramachandran, San Diego, CA (US); Bikash Karmakar, Escondido, CA (US); Abhijeet Prasad, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 52 days.

(21) Appl. No.: 15/997,531

(22) Filed: Jun. 4, 2018

(51) Int. Cl.
| | |
|---|---|
| *G10L 19/005* | (2013.01) |
| *G10L 19/16* | (2013.01) |
| *G10L 19/20* | (2013.01) |
| *G10L 19/12* | (2013.01) |
| *H04W 76/28* | (2018.01) |

(52) U.S. Cl.
CPC ............ *G10L 19/005* (2013.01); *G10L 19/12* (2013.01); *G10L 19/167* (2013.01); *G10L 19/173* (2013.01); *G10L 19/20* (2013.01); *H04W 76/28* (2018.02)

(58) Field of Classification Search
CPC ..... G10L 19/005; G10L 19/12; G10L 19/167; G10L 19/173; G10L 19/20; H04W 76/28
See application file for complete search history.

(56) References Cited

U.S. PATENT DOCUMENTS

| | | | |
|---|---|---|---|
| 6,300,888 B1 * | 10/2001 | Chen .................. | G11B 20/1426 341/63 |
| 7,599,840 B2 * | 10/2009 | Mehrotra ............ | G10L 19/0017 341/67 |
| 8,862,480 B2 * | 10/2014 | Fuchs ..................... | G10L 19/20 704/203 |
| 9,396,736 B2 * | 7/2016 | Resch ..................... | G10L 19/20 |
| 2017/0125029 A1 * | 5/2017 | Atti ........................ | G10L 19/167 |
| 2017/0169833 A1 * | 6/2017 | Lecomte ................. | G10L 19/20 |

\* cited by examiner

*Primary Examiner* — Nafiz E Hoque
(74) *Attorney, Agent, or Firm* — Qualcomm Incorporated

(57) ABSTRACT

A method of smart coding mode switching includes receiving a first data including a primary copy and a partial copy. The method includes determining if switching a coding mode from channel aware mode to non-channel aware mode may be advantageous. The method further includes transmitting a request to another device for coding mode switch in response to determination result. The method includes receiving and decoding of a second data that includes a primary copy.

30 Claims, 11 Drawing Sheets

SMART CODING MODE SWITCHING IN AUDIO RATE ADAPTATION

I. FIELD

The present disclosure is generally related to adjusting coding mode in voice communication.

II. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Electronic devices, such as wireless telephones, may send and receive data via networks. For example, audio data may be sent and received via a circuit-switched network (e.g., the public switched telephone network (PSTN), a global system for mobile communications (GSM) network, etc.) or a packet-switched network (e.g., a voice over internet protocol (VoIP) network, a voice over long-term evolution (VoLTE) network, etc.). The evolution of the 3rd Generation Partnership Project (3GPP) speech codecs has evolved from Adaptive Multi-Rate (AMR) to Adaptive Multi-Rate Wideband (AMR-WB) and to Enhanced Voice Services (EVS).

In a packet-switched network, audio packets corresponding to a sequence of audio frames may be individually routed from a source device to a destination device. Due to network conditions, the audio packets may arrive out of order. The destination device may store received packets in a de-jitter buffer and may rearrange the received packets if the received packets are out-of-order.

The destination device may generate a processed audio signal based on the received packets. A particular packet sent by the source device may not be received, or may be received with errors, by a destination device. The destination device may be unable to recover all or a portion of the data associated with the particular packet. As a buffer depth of the de-jitter buffer increases and a buffering time of a packet prior to being processed increases, quality of a processed audio signal may improve because more packets have time to reach the destination device. However, increasing the buffer depth may increase end-to-end delay adversely impacting a user experience. Reducing the buffer depth reduces the end-to-end delay, but increases chances that the processed audio signal is generated without data for some frames of the sequence of frames because packets corresponding to the frames have not reached the destination device in time.

III. SUMMARY

In a particular aspect, a device includes a de-jitter buffer, an analyzer, a transmitter, and a speech decoder. The de-jitter buffer is configured to receive a first data encoded by a transmitting device based on a first coding mode. The first coding mode may indicate both primary frame encoding and redundant frame encoding. The de-jitter buffer is configured to receive a second data encoded by the transmitting device based on a second coding mode. The second coding mode may indicate only primary frame encoding without redundant frame encoding. The analyzer is configured to determine whether a condition for coding mode change is satisfied. The transmitter is configured to transmit, in response to determining that the condition is satisfied by the analyzer, a request to the transmitting device. The request may indicate coding mode change to the second coding mode corresponding to primary frame encoding only without redundant frame encoding. The speech decoder is configured to decode the first data, which includes a partial copy of a first frame of the audio signal and a primary copy of a second frame of the audio signal. The speech decoder is further configured to decode the second data which includes a primary copy of a third frame of the audio signal without a partial copy of another frame.

In another aspect, a method includes receiving a first data. The first data may be encoded by a transmitting device based on a first coding mode indicating both primary frame encoding and redundant frame encoding. The method also includes decoding the first data, which includes a partial copy of a first frame of the audio signal and a primary copy of a second frame of the audio signal. The method further includes determining whether a condition for coding mode change is satisfied and transmitting a request to the transmitting device in response to determining that the condition is satisfied. The request may indicate coding mode change to a second coding mode corresponding to primary frame encoding without redundant frame encoding. The method also includes receiving a second at the receiving device. The second data maybe encoded by the transmitting device based on the second coding mode. The method also includes decoding the second data. The second data may include a primary copy of a third frame of the audio signal.

In another aspect, a non-transitory computer-readable medium includes instructions that, when executed by a processor within a processor, cause the processor to perform operations including receiving a first data. The first data may be encoded by a transmitting device based on a first coding mode indicating both primary frame encoding and redundant frame encoding. The operations also include decoding the first data, which includes a partial copy of a first frame of the audio signal and a primary copy of a second frame of the audio signal. The operations further include determining whether a condition for coding mode change is satisfied and transmitting a request to the transmitting device in response to determining that the condition is satisfied. The request may indicate coding mode change to a second coding mode corresponding to primary frame encoding without redundant frame encoding. The operations also include receiving a second at the receiving device. The second data maybe encoded by the transmitting device based on the second coding mode. The operations also include decoding the second data. The second data may include a primary copy of a third frame of the audio signal.

In another aspect, a device includes means for receiving a first data. The first data may be encoded by a transmitting device based on a first coding mode indicating both primary frame encoding and redundant frame encoding. The device also includes means for decoding the first data, which includes a partial copy of a first frame of the audio signal and a primary copy of a second frame of the audio signal. The device further includes means for determining whether a condition for coding mode change is satisfied and means for transmitting a request to the transmitting device in response to determining that the condition is satisfied. The request may indicate coding mode change to a second coding mode corresponding to primary frame encoding without redundant frame encoding. The device also includes means for receiving a second at the receiving device. The second data maybe encoded by the transmitting device based on the second coding mode. The device also includes means for means for decoding the second data. The second data may include a primary copy of a third frame of the audio signal.

IV. BRIEF DESCRIPTION OF THE DRAWINGS

V. DETAILED DESCRIPTION

Figure 1:
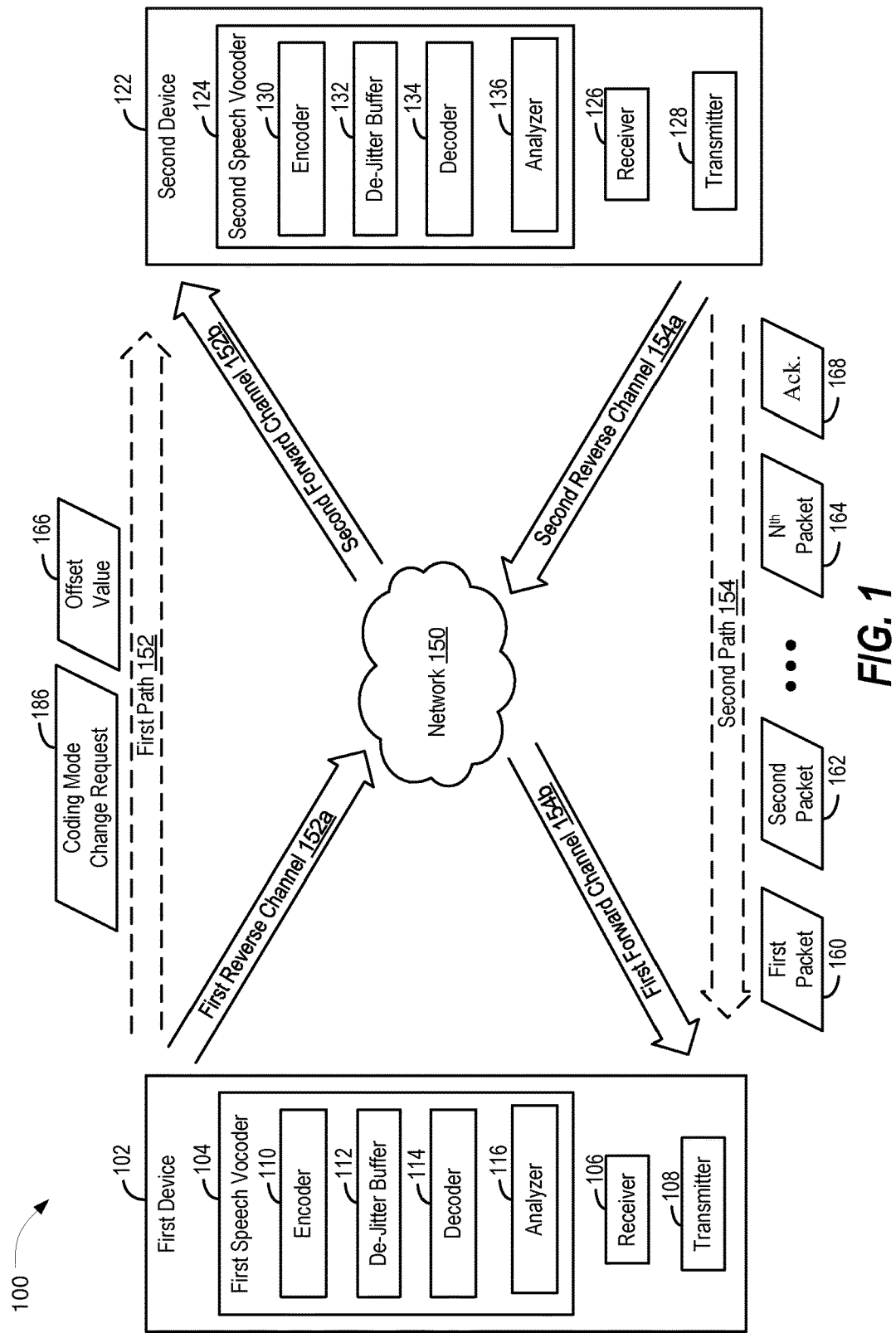
FIG. 1 is a particular illustrative example of a system operable to change coding mode based on a request.

The principles described herein may be applied, for example, to a headset, a handset, or other audio device that is configured to perform redundancy based packet transmission error recovery. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled."

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more." The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element," "block," and "module" may be used to indicate a portion of a greater configuration and may be implemented in hardware (e.g., circuitry), software or a combination of both.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc. The devices described herein may be compatible with one or more mobile telecommunication technologies. For example, the devices described herein may be compatible with third generation (3G) mobile telecommunication technologies, fourth generation (4G) mobile telecommunication technologies, and/or fifth generation (5G) mobile telecommunication technologies. Additionally, or in the alternative, the devices described herein may be compatible with different standards (e.g., a Long-Term Evolution (LTE) wireless communication standard, a LTE-A wireless communication standard, a Worldwide Interoperability for Microwave Access (WiMAX) wireless communication standard, etc.).

Unless otherwise indicated, the terms "codec," "vocoder," "audio coder," and "speech coder" refer to the combination of an audio encoder and a corresponding audio decoder. Unless otherwise indicated, the term "coding" indicates transfer of an audio signal via a codec, including encoding and subsequent decoding. Unless otherwise indicated, the term "transmitting" indicates propagating (e.g., a signal) into a transmission channel.

Audio telecommunications applications may be implemented in a packet-switched network. For example, audio telecommunications applications may be implemented in a Voice over Internet Protocol (VoIP) network. A packet may include one or more frames of the encoded audio signal, and packets with audio (e.g., voice) information may be transmitted from a first device to a second device on the network.

However, some of the packets may be lost during the transmission of the packets. For example, the loss of multiple packets (sometimes referred to as burst packet loss) may be a reason for the degradation of perceived speech quality at a receiving device.

In order to alleviate the degradation of the perceived speech quality caused by packet losses in a VoIP network, several solutions may exist. One solution is a receiver-based packet loss concealment (PLC) approach. A PLC method may be used to mask the effects of packet loss in VoIP communications. For example, a PLC method may be implemented to create a substitute packet instead of the one that was lost during transmission. Such a PLC method may attempt to create a packet as similar as possible to the one that was lost. Receiver-based PLC methods may not need any additional resources or help from the sender in order to create the substitute packet. When important speech frames are lost, however, a PLC method may be ineffective at masking effects of the packet loss. Another solution is a sender-based packet loss resilient approach. Such an approach includes forward error correction (FEC) methods, which may include sending some additional data with each packet. The additional data may be used to restore errors caused by the loss of data during the transmission. For example, FEC schemes may transmit redundant audio frames. In other words, more than one copy (typically two) of an audio frame is transmitted by the sender. These two frames may be referred to as a primary copy and a redundant copy.

Although sender-based packet loss resilient schemes may improve the perceptual quality of the decoded speech, these schemes may also increase the bandwidth used during transmission of the speech. Traditional FEC schemes may also increase the end-to-end delay, which may be intolerable for real-time conversations. For example, conventional sender-based schemes send the same speech frame twice at two different time periods. This approach may at least double the data rate. Some conventional schemes may use a low-bit rate codec for the redundant copy in order to reduce the data rate. However, the use of a low-bit rate codec may increase the complexity at the encoder. In addition, some conventional schemes may use the same low-bit rate codec for both the primary copy of the frame and the redundant copy of the frame. Although this approach may reduce the complexity at the encoder as well as reduce the data rate, the baseline speech quality (i.e., the speech quality when no frames are lost) may be greatly reduced. Further, conventional sender-based schemes typically operate under the assumption of an additional delay of at least one frame interval.

Systems, methods, and apparatus as described herein may be implemented to provide a source- and channel-controlled FEC scheme in order to obtain an optimal trade-off between speech quality, delay, and data rate. The FEC scheme may be configured such that no additional delay is introduced. High quality improvement of the speech quality under moderate data rate increases may be achieved. An FEC scheme as described herein may also operate at any target data rate. In one example, the FEC scheme and a target data rate may be adaptively adjusted based on the condition of a transmission channel as well as external controls.

For some codecs for audio (e.g., voice) communications, the total number of bits used to encode each frame is a predetermined constant. Examples of such codecs include the Adaptive Multi Rate (AMR) speech codec, the AMR Wideband (AMR-WB) speech codec, and Enhanced Voice Services (EVS) speech codec in which the number of bits is determined by the coding mode selected for the frame. In such cases, transmitting a redundant copy of a past frame may require a corresponding reduction in the number of bits available for coding the signal information in the current frame. This reduction may have a negative impact on the perceptual quality of the decoded speech.

3GPP EVS supports bandwidths over an audio frequency range up to 20 kHz for four modes in EVS. The four supported bandwidths include narrowband (NB), wideband (WB), super wideband (SWB) and full band (FB). In various examples, NB supports voice, WB supports high definition (HD) voice, SWB supports voice (including HD voice) and music and FB supports voice (including HD voice) and high definition (HD) music. In various examples, EVS supports a wide range of audio frequencies with the following attributes: a) the low-range frequencies may improve naturalness and listening comfort; b) the mid-range frequencies may improve voice clarity and intelligibility; and c) the high-range frequencies may improve sense of presence and contribute to better music quality.

Table 1 illustrates examples of EVS bitrates and supported bandwidths. The EVS bitrates are the source bitrates; that is after source compression or source coding. The EVS bitrates are in units of kilobits per second (kbps). Each EVS bitrate in Table 1 is mapped to corresponding supported bandwidths, where NB is narrowband, WB is wideband, SWB is super wideband and FB is full band. Each bitrate is unique in its mapping to the supported bandwidth except for bitrate 13.2 kbps which has a channel aware option that does not include NB as its supported bandwidth. In various examples, all the bitrates illustrated in Table 1 support discontinuous transmission (DTX).

TABLE 1

| EVS Bitrates (kbps) | Supported Bandwidth | Notes |
| --- | --- | --- |
| 5.9 (SC-VBR) | NB, WB | Source-controlled variable bitrate with DTX |
| 7.2 | NB, WB | |
| 8.0 | NB, WB | |
| 9.6 | NB, WB, SWB | |
| 13.2 | NB, WB, SWB | |
| 13.2 (Channel Aware Mode) | WB, SWB | |
| 16.4 | NB, WB, SWB, FB | |
| 24.4 | NB, WB, SWB, FB | |
| 32 | WB, SWB, FB | |
| 48 | WB, SWB, FB | |
| 64 | WB, SWB, FB | |
| 96 | WB, SWB, FB | |
| 128 | WB, SWB, FB | |

The EVS channel aware mode (CAM) significantly improve the performance under degraded channel conditions while maintaining the clean channel quality. EVS CAM allows in-band redundancy transmission as part of the codec payload in a constant bitrate stream, and is implemented for wideband (WB) and super-wideband (SWB) at 13.2 kbps. The transmission of redundancy (a partial copy or a partial data of another frame) may be either channel-controlled or source-controlled. For channel-controlled case, an encoder encoding behavior may be based on condition of a network such as network congestion or frame error rate. For source-controlled case, an encoder can use properties of an input source signal to determine the frames that are critical for high quality reconstruction and selectively transmit redundancy for those frames only. Furthermore, an encoder can also identify the frames that can be best coded at a reduced bitrate in order to accommodate the attachment of redundancy while keeping the bitstream at a constant 13.2 kbps rate.

Referring to FIG. 1, a particular illustrative example of a system operable to change coding mode based on a request is disclosed and generally designated 100. The system 100 includes a first device 102 in communication with one or more other devices (e.g., a second device 122) via a network 150. The first device 102 may send data to the second device 122 via the network 150 using a first path 152, and the second device 122 may send data to the first device 102 via the network 150 using a second path 154.

The first device 102 may communicate with the network 150 via a first reverse channel 152a (e.g., a first reverse link) and a first forward channel 154b (e.g., a first forward link). For example, the first device 102 may transmit data to the network 150 using the first reverse channel 152a, and the first device 102 may receive data from the network 150 using the first forward channel 154b. The second device 122 may communicate with the network 150 via a second reverse channel 154a (e.g., a second reverse link) and a second forward channel 152b (e.g., a second forward link). For example, the second device 122 may transmit data to the network 150 using the second reverse channel 154a, and the second device 122 may receive data from the network 150 using the second forward channel 152b.

The network 150 may include one or more base stations or access points to communicate data between the first device 102 and the second device 122. As used herein, data (e.g., packets, frames, offset values, acknowledgements, etc.) communicated via the first path 152 corresponds to data transmitted from the first device 102 to the network 150 via the first reverse channel 152a and received at the second device 122 from the network 150 via the second forward channel 152b. In a similar manner, data communicated via the second path 154 corresponds to data transmitted from the second device 122 to the network 150 via the second reverse channel 154a and received at the first device 102 from the network 150 via the first forward channel 154b.

The devices 102, 122 may include fewer or more components than illustrated in FIG. 1. For example, the devices 102, 122 may include one or more processors, one or more memory units, or both. According to one implementation, the first device 102 and/or the second device 122 may be a smart phone, a cellular phone, a mobile communication device, a laptop computer, a computer, a tablet, a PDA, a set top box, a video player, an entertainment unit, a display device, a television, a gaming console, a music player, a radio, a digital video player, a digital video disc (DVD) player, a tuner, a camera, a navigation device, or a combination thereof. Such devices may include a user interface (e.g., a touch screen, voice recognition capability, or other user interface capabilities).

The first device 102 includes a first speech vocoder 104, a receiver 106, and a transmitter 108. The first speech vocoder 104 includes an encoder 110, a de-jitter buffer 112, a decoder 114, and an analyzer 116. The second device 122 includes a second speech vocoder 124, a receiver 126, and a transmitter 128. The second speech vocoder 124 includes an encoder 130, a de-jitter buffer 132, a decoder 134, and an analyzer 136. As described herein, the first device 102 will be described as a "receiving device" and the second device 122 will be described as a "transmitting device." For example, the second device 122 may transmit packets that are received by the first device 102. However, in other implementations, each device 102, 122 may concurrently operate as a receiving device and a transmitting device. For example, the first device 102 may transmit packets to the second device 122 via the first path 152 (e.g., transmit packets to the network 150 via the first reverse channel 152a) and concurrently receive packets from the second device 122 via the second path 154 (e.g., receive packets from the network 150 via the first forward channel 154b). Additionally, the second device 122 may transmit packets to the first device 102 via the second path 154 (e.g., transmit packets to the network 150 via the second reverse channel 154a) and concurrently receive packets from the first device 102 via the first path 152 (e.g., receive packets from the network 150 via the second forward channel 152b).

The receiver 106 may be configured to receive data (e.g., one or more packets) from the second device 122 via the second path 154. To illustrate, the transmitter 128 may be configured to transmit a first packet 160, a second packet 162, and an Nth packet 164 to the network 150 via the second reverse channel 154a. The receiver 106 may be configured to receive the first packet 160, the second packet 162, and the Nth packet 164 from the network 150 via the first forward channel 154b. N may be any integer value that is greater than zero.

The receiver 106 may provide the received packets 160-164 to the de-jitter buffer 112. The de-jitter buffer 112 may be configured to store (e.g., buffer) the packets 160-164 received by the receiver 106. To illustrate, the de-jitter buffer 112 may have a storage capacity (e.g., a "depth") to store a number "D" of packets. The packets 160-164 may arrive out of order due to the dynamic nature of the wireless network 150. For example, the second packet 162 may arrive at the receiver 106 prior to the first packet 160 arriving at the receiver 106 due to a network delay, a data handling capacity, wireless signal conditions, a network load, etc. The de-jitter buffer 112 may be configured to "absorb" or reduce the jitter (e.g., the delay) in the packet arrival time by buffering the packets 160-164 received by the receiver 106 and providing a packet the decoder 114 at regular intervals (e.g., approximately once every 20 milliseconds (ms)).

The analyzer 116 or, alternatively, the decoder 114 may reorder one or more of the packets 160-164 in the de-jitter buffer 112 if the packets 160-164 are out-of-order. Additionally, one or more packets 160-164 sent by the second device 122 may not be received, or may be received with errors, by the first device 102. For example, a packet (e.g., the first packet 160) may not be received due to packet loss or may be partially received, due to network conditions, by the receiver 106. The analyzer 116 or the decoder 114 may determine whether a particular packet is missing from the de-jitter buffer 112.

To circumvent problems at the decoder 114 caused by a lost packet (or a packet received with errors), subsequent packets may include error correction data associated with the lost packet. According to one implementation, the error correction data may include a partial copy of the lost packet. Thus, the analyzer 116 or the decoder 114 may retrieve a subsequent packet (having error correction data associated with the lost packet) from the de-jitter buffer 112 in response to determining that the lost packet is missing from the de-jitter buffer 112. For example, if the analyzer 116 or the decoder 114 determines that the first packet 160 (e.g., a "current frame") is missing from the de-jitter buffer 112 (or includes errors), the analyzer 116 or the decoder 114 may determine whether a subsequent packet (that includes error correction data or partial copy associated with the first packet 160) is stored in the de-jitter buffer 112.

The actual transmission of the partial (redundant) copy of the first packet 160 (e.g., for frame N) may occur at frame N+offset (e.g., the offset value 166), where the value of offset k may indicate the distance between the primary copy of a frame and the partial copy of the frame. This offset value k may also be referred to as FEC offset value. In one example, typical values of the offset k may include one, two, three, five, and integers greater than five. The offset value k (e.g., the offset value 166) may be fixed (e.g., during system implementation or during call set-up) or may be selected and/or updated during a call according to channel conditions based on feedback (e.g., coding mode change request 186) from the receiving device (e.g., the first device 102). For example, it may be desirable to use a higher value of offset k in an environment that is causing a frequent loss of consecutive frames (e.g., due to long fades). According to one implementation, the analyzer 116 may determine an optimum offset value ($X_{opt}$) and the transmitter 108 may transmit the offset value 166 to the receiver 126 of the second device 122. The optimum FEC offset value ($X_{opt}$) may correspond to the offset value 166 that yields the greatest probability of successfully decoding a lost packet.

The receiver 126 of the second device 122 may receive the offset value 166 and provide the offset value 166 to the encoder 130. Upon reception of the offset value 166, the second device 122 may send an acknowledgment 168 to the first device 102 via the second path 154. For example, when the encoder 130 receives the offset value 166, the encoder 130 (or another processor) may generate the acknowledgement 168, and the transmitter 128 may transmit the acknowledgement 168 to the network 150 via the second reverse channel 154a. According to one implementation, one or more packets that include partial redundancy data transmitted from the second device 122 to the first device 102 may include the acknowledgment 168 in addition to, or instead of, sending a dedicated message to signal acknowledgement. The second device 122 may also acknowledge receipt of the offset value 166 by including the offset value 166 in the frame that includes the partial redundancy.

The analyzer 116 may determine whether a condition to trigger coding mode change is satisfied. In one implementation, the analyzer 116 may determine whether the condition for coding mode change for encoders 130 110 is satisfied or not based on how many partial copies among received packets 160 162 164 from the second device being decoded by the decoder 114. In another implementation, the analyzer 116 may determine whether the condition to trigger coding mode change for encoders 130 110 is satisfied or not based on statistical information indicating how many partial copies being decoded by the decoder 114 in lieu of their corresponding primary copies. For example, the analyzer 116 may monitor the latest M number of received packets encoded by the encoder 130 according to channel aware mode in which case all the transmitted packets 160 162 164 from the second device 122 may include primary copies, and all or some of the transmitted packets 160 162 164 by the second device 122 may include partial copies. In an ideal or excellent channel condition scenario, it is likely that all or most of the primary copies of transmitted packets 160 162 164 may be received by the first device. In such case, the likelihood of any primary copies within the packets 160 162 164 being decoded by the decoder 114 in lieu of the corresponding primary copy is quite low. Then, the analyzer 116 may determine the effectiveness of partial frame encoding is low and may decide to send the second device 122 a request for coding mode change from, for example, a channel aware mode to a non-channel aware mode.

Alternatively, in an extremely harsh channel condition scenario where frame error rate is high, the analyzer 116 may also determine the effectiveness of partial frame encoding is low and may decide to send the second device 122 a request for coding mode change from a channel aware mode to a non-channel aware mode. For example, in such extremely harsh channel condition scenario, it is likely that many of the partial copies of transmitted packets 160 162 164 may be also lost and thus not available in the de-jitter buffer 112. Then, the analyzer 116 may determine the effectiveness of partial frame encoding is low and may decide to send the second device 122 a request for coding mode change from, for example, a channel aware mode to a non-channel aware mode.

According to another implementation, the analyzer 116 may determine whether the condition to trigger coding mode change for encoders 130 110 is satisfied or not based on a real-time quality metric of decoded speech signal. The real-time quality metric may be measured objectively or subjectively based on the quality of the decoded audio samples. For example, the analyzer 116 may calculate quality measurement of decoded speech sample based on Perceptual Evaluation of Audio Quality (PEAQ) or Perceptual Evaluation of Speech Quality (PESQ). The analyzer 116 may compare the quality measurement with a threshold to determine whether the redundant frame coding in a channel aware mode contributes any quality improvement. In a case where the analyzer 116 determines the quality contribution by the partial copies included the transmitted packets 160 162 164 from the second device 122 is below the threshold, the analyzer may decide to send the second device 122 a request for coding mode change from, for example, a channel aware mode to a non-channel aware mode.

According to another implementation, the analyzer 116 may determine whether the condition to trigger coding mode change for encoders 130 110 is satisfied or not based on information or indication received from another layer (e.g., upper layers) of communication protocol. For example, this indication may be from audio layer through error concealment mechanism.

If the analyzer 116 determines a condition to trigger coding mode change is satisfied, the transmitter 108 may transmit a request for coding mode change to the second device 122 through the first path 152. Upon receiving the request by the second device, the analyzer 136, or alternatively the encoder 130, may configure the encoder 130 from a first coding mode to a second coding mode. According to one implementation, the first coding mode may correspond to a channel aware mode and the second coding mode may correspond to a non-channel aware mode. For example, the first coding mode may correspond to EVS 13.2 kbps a channel aware mode and the second coding mode may correspond to EVS 13.2 kbps a non-channel aware mode. In another implementation, the first coding mode may correspond to EVS 13.2 kbps a channel aware mode and the second coding mode may correspond to EVS a non-channel aware mode with higher bitrate than 13.2 kbps. As a non-limiting example, the second coding mode may correspond to EVS 24.4 kbps coding mode. Alternatively, the first coding mode may correspond to a non-channel aware mode and the second coding mode may correspond to a channel aware mode.

Figure 2:
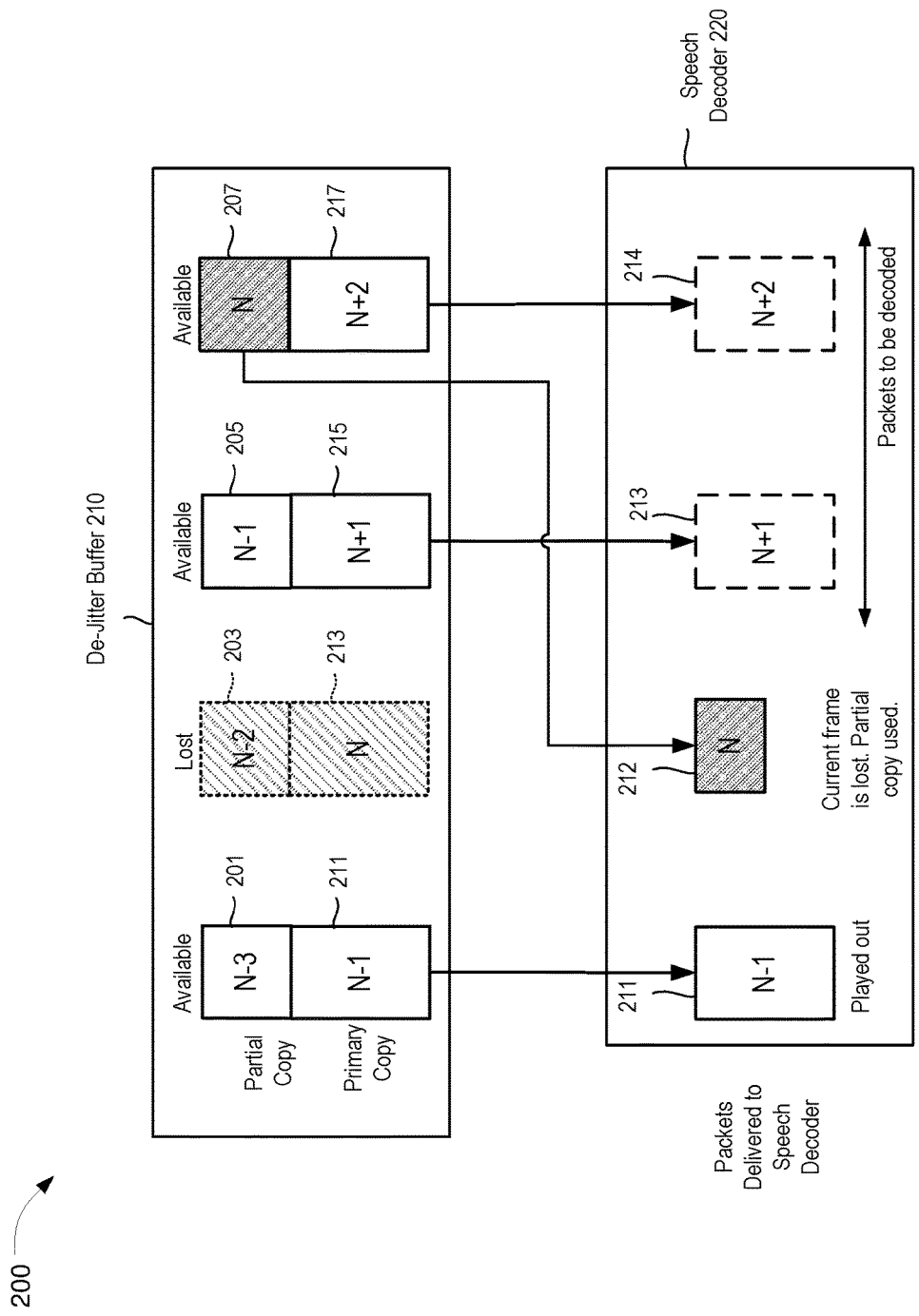
FIG. 2 is a diagram illustrating a particular example for operation of channel aware mode.

Referring to FIG. 2, a diagram illustrating a particular example for operation of channel aware mode is disclosed and generally designated 200. The diagram 200 includes de-jitter buffer 210 and speech decoder 220. The de-jitter buffer 210 may correspond to the de-jitter buffer 112 132 of FIG. 1, and the speech decoder 220 may correspond to the decoder 114 134 of FIG. 1. The de-jitter buffer 210 includes primary copies and partial copies. In this particular example, the offset value k is chosen 2 for illustration only. According to one implementation, one or more packets 160 162 164 may include both the primary copy and the partial copy. For example, the primary copy for frame N−1 211 and the partial copy for frame N−3 201 may be included in the first packet 160, and the primary copy for frame N 213 and the partial copy for frame N−2 203 may be included in the second packet 162.

The primary copies 211 213 215 217 in the de-jitter buffer may have been encoded by the encoder 130 in the second speech vocoder 124 based on primary frame coding scheme. In one particular example, the primary copies 211 213 215 217 may have been encoded based on primary frame coding scheme according to the EVS 13.2 kbps channel aware mode. The partial copies 201 203 205 207 in the de-jitter buffer may have been encoded by the encoder 130 in the second speech vocoder 124 based on redundant frame coding scheme. In one particular example, the partial copies 201 203 205 207 may have been encoded based on redundant frame coding scheme according to the EVS 13.2 kbps channel aware mode, the second device 122 may send packets 160 162 164 the first device 102 may operate on a constant-bit-rate (e.g., 13.2 kbps) channel. In this implementation, a primary frame bit-rate corresponding to primary copy may be reduced (e.g., to 9.6 kbps) to accommodate the redundant copy. For example, a remaining bit-rate (e.g., 3.6 kbps) of the constant-bit-rate may correspond to the redundant copy.

The speech decoder 220 may decide which copy among the primary copy and the partial copy should be decoded based on the availability of each packet in the de-jitter buffer 210 at the time of decoding each frame. According to one implementation, the analyzer 116 (not shown in FIG. 2) may determine, at the time for frame N−1 decoding, that primary copy for the frame N−1 211 is available in the de-jitter buffer 210 and the speech decoder 220 may subsequently decode the primary copy for the frame N−1 211. At the time for frame N decoding, however, the analyzer 116 may determine that primary copy for the frame N 213 is not available in the de-jitter buffer 210. The analyzer 116 may search if the partial copy for the frame N 207 is available in the de-jitter buffer 210. In case the partial copy for the frame N 207 is indeed available in the de-jitter buffer 210, then the analyzer 116 may instruct the speech decoder 220 to decode the partial copy for the frame N 207, in lieu of the primary copy for the frame N 213. In a similar manner, the speech decoder 220 may proceed with decoding the primary copy for the frame N+1 215 and the primary copy for the frame N+2 217 because these primary copies 215 217 are already available in the de-jitter buffer 210.

Figure 3:
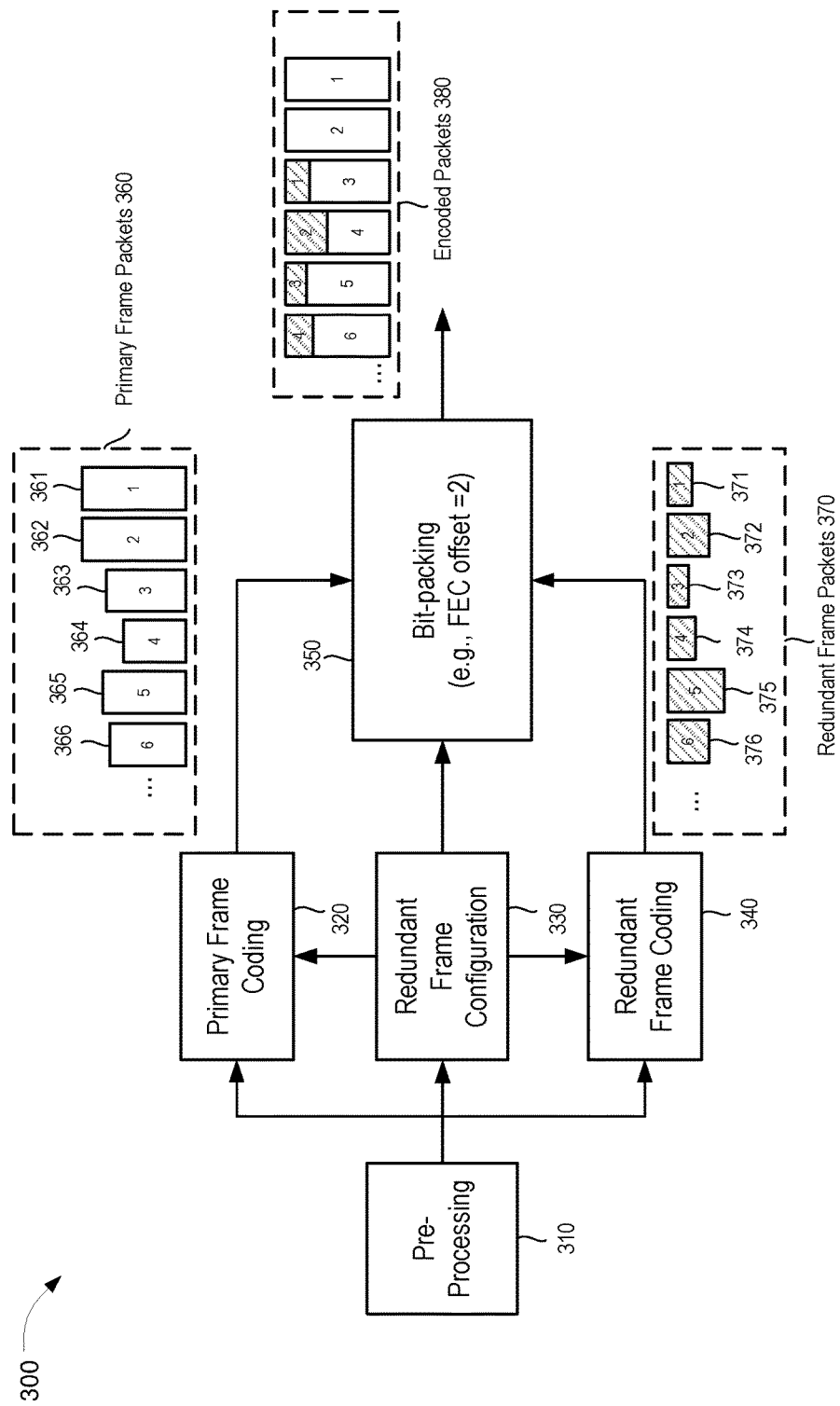
FIG. 3 is a particular exemplary diagram for high-level description of channel aware encoding.

Referring to FIG. 3, a particular exemplary diagram for high-level description of channel aware encoding is disclosed and generally designated 300. The diagram 300 includes pre-processing 310, primary frame coding 320, redundant frame coding 340, redundant frame configuration 330, and bit-packing 350 blocks. In one implementation, the diagram 300 may indicate EVS channel aware encoding scheme.

The pre-processing block 310 may perform various signal processing on input audio signal that may be sampled at either 16 kHz (WB) or 32 kHz (SWB) and may be segmented, for example, into frames of 20 msec. In one implementation, the pre-processing block 310 may perform resampling of the input frame (e.g., to 12.8 kHz); signal detection such as a voice activity detection (VAD), bandwidth detection, time-domain transient detection; signal classification such as speech/music classification or open-loop classification; and signal parameter estimation such as correlation, frame type, and pitch lag.

The redundant frame configuration block 330 may determine, based on the parameters from the pre-processing block 310, the compressibility of a current frame to enable the inclusion of a partial copy associated with a previous frame. For example, the compressibility of the current frame may indicate whether the current frame can allow for bitrate reduction with minimal perceptual impact or the current frame is "critical frame." A frame may be considered as critical to protect when loss of that frame would cause significant impact to the speech quality at the receiver. The threshold to determine whether a particular frame is critical or not may be a configurable parameter at the encoder, which can be dynamically adjusted depending on network conditions. For example, under high FER conditions it may be desirable to adjust the threshold to classify more frames as critical. The criticality may also depend on the ability to quickly recover from the loss of a previous frame. For example, if the current frame depends heavily on the previous frame's synthesis, then the current frame may get re-classified from being non-critical.

The redundant frame configuration block 330 may further determine, based on the parameters from the pre-processing block 310, redundant frame (RF) type classification which controls the number of bits needed to faithfully reconstruct the current frame through the partial copy that is transmitted in a future frame. For example, the partial copy of the frame N will be transmitted along with frame N+2 because the FEC offset is 2 in this example. Strongly-voiced and unvoiced frames are suitable for carrying partial copies of a previous frame with negligible perceptual impact to the primary frame quality.

The primary frame coding block 320 may encode a plurality of input frames according to either ACELP coding technology or an MDCT-based coding technology and generate a plurality of primary frame packets 360. The selection between ACELP coding technology and an MDCT-based coding technology for any particular frame may be based on the signal characteristic of the particular frame or may be based on the signal received from redundant frame configuration block 330. The primary frame coding block 320 may determine which frames can be best be encoded at a reduced frame rate, and the size of each of the plurality of primary frame packets 360 may vary based on a measure of compressibility of each frame. For example, the primary frame packet 364 shows better compressibility than the primary frame packet 363 or the primary frame packet 365.

The primary frame coding block 320 may use the ACELP coding technology to encode the low band core up to 6.4 kHz while the upper band that is beyond 6.4 kHz and up to the Nyquist frequency is encoded using the Time-domain Bandwidth Extension (TBE) technology. The upper band is parameterized into LSPs and gain parameters to capture both the temporal evolution per sub-frame as well as over an entire frame. The primary frame coding block 320 may also use the MDCT-based coding technologies (e.g., Transform Coded Excitation (TCX) and Intelligent Gap Filling (IGF)) to encode the background noise frames and mixed/music content more efficiently. In one implementation, the EVS CAM leverages these ACELP and TCX core advancements for primary frame encoding. Additionally, a classifier, such as an SNR-based open-loop classifier, may be used to decide whether to choose the ACELP/TBE based coding technology or the MDCT-based coding technology to encode the primary frame.

The redundant frame coding block 340 may perform compact re-encoding of small subset of key parameters that are critical to protect and may generate a plurality of redundant frame packets 370. The set of critical parameters may be identified based on the frame's signal characteristics and may be re-encoded at a much lower bitrate (e.g., less than 3.6 kbps). The size of the redundant frame packets 370 is variable and may depend on the characteristics of the input signal or may be based on the signal received from redundant frame configuration block 330. In one implementation, the criticality measure may be used to determine whether redundant frame coding is required or to determine the size of the redundant frame packets 370.

The redundant frame coding block 340 may perform redundant frame encoding based on either ACELP-based coding technology or MDCT-based coding technology. The redundant frame coding block 340 may perform an ACELP-based redundant frame encoding based on the RF type received from the redundant frame configuration block 330. In one implementation, the redundant frame coding block 340 may perform an ACELP redundant frame encoding for the RF frame types such as RF_NOPRED, RF_ALLPRED, RF_GENPRED, or RF_NELP. The redundant frame coding block 340 may perform an MDCT-based redundant frame encoding based on the RF type received from the redundant frame configuration block 330. In one implementation, the redundant frame coding block 340 may perform an MDCT-based redundant frame encoding for the RF frame types such as RF_TCXFD, RF_TCXTD1, or RF_TCXTD2.

The bit-packing block 350 may arrange the primary frame packets 360 and the redundant frame packets (e.g., the partial copy) 370, and may generate encoded packets 380. The bit-packing block 350 may arrange the primary frame packets 360 and the redundant frame packets 370 based on FEC offset (e.g., 2). For instance, when FEC offset is 2, bit-packing block 350 may piggyback the redundant frame packet 372 (e.g., for redundant frame packet for frame 2) on the primary frame packet 366 (e.g., for primary frame packet labelled for frame 4). The encoded packets 380 may include not only the primary frame packets 360 and the redundant frame packets 370, but also additional parameters, for example, such as RF frame type and FEC offset.

Figure 4:
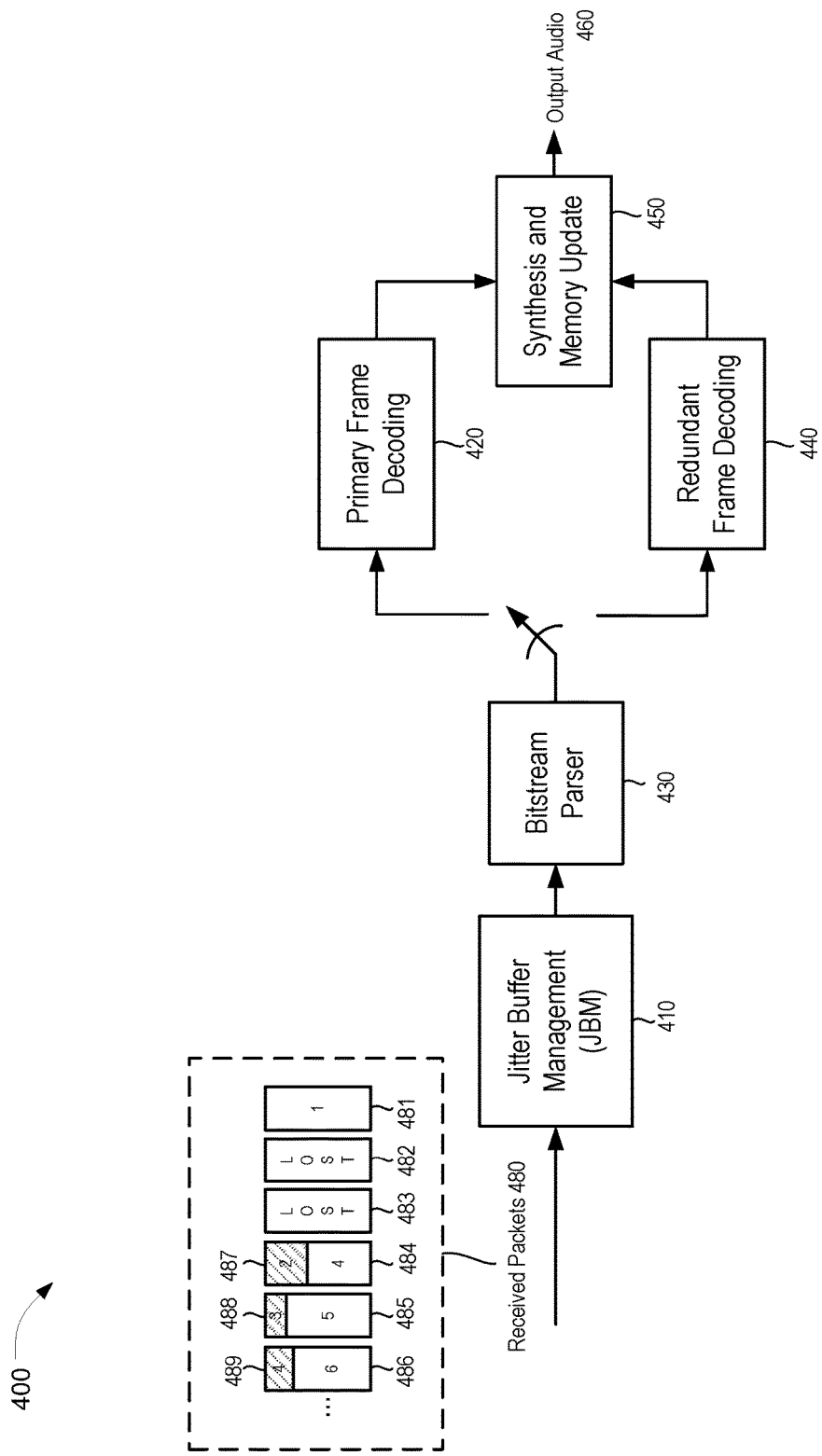
FIG. 4 is a particular exemplary diagram for high-level description of channel aware decoding.

Referring to FIG. 4, a particular exemplary diagram for high-level description of channel aware decoding is disclosed and generally designated 400. The diagram 400 includes jitter buffer management (JBM) 410, bitstream parser 430, primary frame decoding 420, redundant frame decoding 440, and synthesis and memory update 450 blocks. In one implementation, the diagram 400 may indicate EVS channel aware decoding scheme.

The JBM block 410 may receive a plurality of packets 480 and store them in a de-jitter buffer. For example, the plurality of packets 480 may be transmitted from the first device 102 and may be received by the second device 122 via the receiver 126. The de-jitter buffer within the JBM block 410 may correspond to the de-jitter buffer 132. The received packets 480 may include a packet 481 that comprises a primary copy, a packet that comprises both a primary copy 484 485 486 and a partial copy 487 488 489. Packets 482 483 may represent packets lost during transmission. In one implementation, if a current packet (or frame) is not lost, the JBM block 410 may provide the primary copy of the current packet, which was encoded in accordance with primary frame encoding scheme, to primary frame decoding block 420 and disregard any RF information present in the current packet. In case the current packet (or frame) is lost, and a partial copy for the current frame is available in the de-jitter buffer as part of another packet, then the JBM block 410 may provide the partial copy for the current frame to the redundant frame decoding 440. If the partial copy for the current frame is also not available in the de-jitter buffer, then the decoder 134 may perform any frame erasure concealment processing.

The bitstream parser block 430 may decide whether any particular packet in received packets 480 needs to be decoded either by the primary frame decoding block 420 or by the redundant frame decoding block 440. In one implementation, the bitstream parser block 430 may be corresponding to the analyzer 136. The bitstream parser block 430 may extract the RF frame type information in the received packets 480 to decide whether to pass the received packets to the primary frame decoding block 420 or the redundant frame decoding block 440. In some configurations, the bitstream parser block 430 may pass the bitstream to the subsequent decoding blocks based on an information from the JBM block 410. The bitstream parser block 430 may detect whether received packets are successfully received without errors. In some configurations, the bitstream parser block 430 may make this determination based on an indicator from a channel decoder that indicates whether a packet was successfully received or not.

The primary frame decoding block 420 may receive a plurality of primary copy 481 484 485 486 and decode them according to either ACELP coding technology or an MDCT-based coding technology and generate decoded PCM samples for a current frame. The redundant frame decoding block 440 may receive a plurality of partial copy 487 488 489 at the time of decoding a current frame, which likely was lost during the transmission or received with errors therein, and decode them according to either ACELP coding technology or an MDCT-based coding technology and generate decoded PCM samples for a current frame. In one implementation, depending on the RF frame type, if the current frame corresponds to an ACELP partial copy, then the RF parameters (e.g., LSPs, ACB and/or FCB gains, and upper band gain) are decoded for ACELP synthesis. ACELP partial copy synthesis follows similar steps to that of the primary frame decoding except that the missing parameters (e.g., certain gains and pitch lags are only transmitted in alternate subframes) are extrapolated.

The synthesis and memory update block 450 may receive the decoded PCM samples for the current from either the primary frame decoding 420 or the redundant frame decoding 440, and reconstruct output audio 460 via post processing. The examples of the post processing may include extrapolation of some parameters derived from the previously decoded frames and may be based on signal characteristic of decoded parameters (e.g., spectral tilt).

Figure 5:
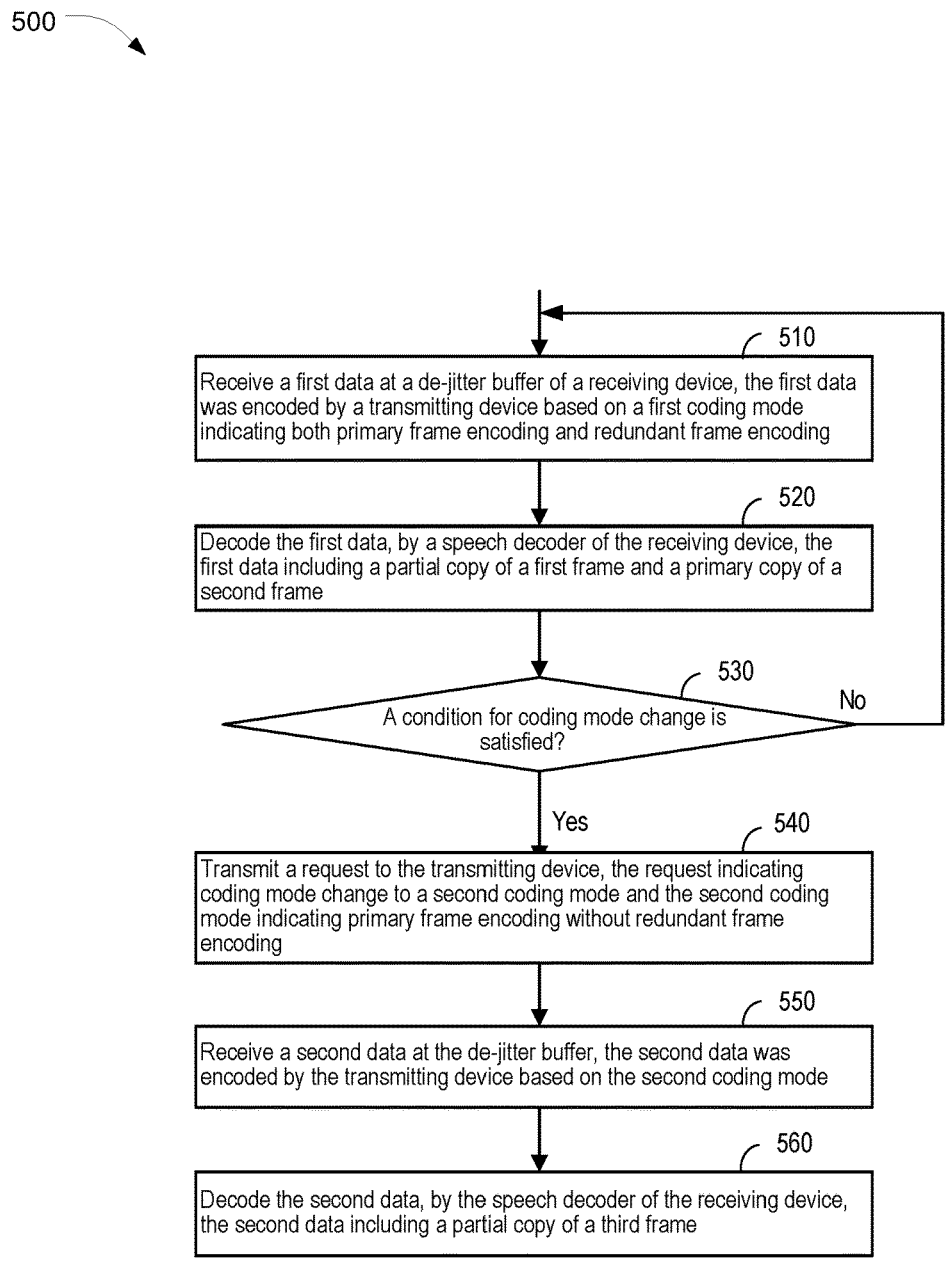
FIG. 5 is a flow chart illustrating a particular method of changing coding mode.

Referring to FIG. 5, a method 500 for switching a coding mode from a first coding mode to a second coding mode is disclosed. The method 500 includes receiving a first data at a de-jitter buffer of a receiving device, at 510. The de-jitter buffer may correspond to the de-jitter buffer 132 and the receiving device may correspond to the second device 122. The first data was encoded by a transmitting device (e.g., the first device 102) based on a first coding mode indicating both primary frame encoding and redundant frame encoding. As a non-limiting example, the first coding mode may correspond to EVS 13.2 kbps channel aware mode, and the second coding mode may correspond to EVS 13.2 kbps non-channel aware mode or EVS 24.4 kbps.

The method 500 includes decoding the first data, by a speech decoder of the receiving device, at 520. The speech decoder may correspond to the decoder 134 of the second device 122. For example, the first data may include both a partial copy of a first frame, which was encoded by the redundant frame coding block 340, and a primary copy of a second frame, which was encoded by the primary frame coding block 320.

The method 500 includes determining, at the receiving device, whether a condition for coding mode change is satisfied, at 530. In some implementation, the method 530 may be performed by the analyzer 116. The analyzer 116 may determine whether the condition for coding mode change is satisfied based on how many partial copies among recently received packets were used for decoding by the decoder 114. For example, the analyzer 116 may make this determination based on the number of partial copies decoded by the redundant frame decoding block 440 among the received partial copies 487 488 489.

Additionally, the analyzer 116 may determine whether the condition to trigger coding mode change is satisfied based on a real-time quality metric of decoded speech signal. The real-time quality metric may be measured objectively or subjectively based on the quality of the decoded audio samples. For example, the analyzer 116 may calculate quality measurement of decoded speech sample based on PEAQ or PESQ. The analyzer 116 may compare the quality measurement with a threshold to determine whether the redundant frame coding in a channel aware mode contributes any quality improvement. The analyzer 116 may also determine whether the condition to trigger coding mode change is satisfied based on information or indication received from another layer (e.g., upper layers) of communication protocol. For example, this indication may be from audio layer through error concealment mechanism.

The method 500 includes transmitting a request to the transmitting device, in response to determining that the condition is satisfied, at 540. The request may be transmitted by the transmitter 128 of the second device 122 to the receiver 106 of the first device 102. The request may indicate coding mode change for the first device 102 from the first coding mode to a second coding mode. In one preferred implementation, the second coding mode may correspond to encoding by only primary frame coding block 320 (i.e., no use of redundant frame encoding scheme).

The method 500 includes receiving a second data at the de-jitter buffer of the receiving device, where the second data was encoded by the transmitting device based on the second coding mode, at 550. The method 500 further includes decoding the second data by the speech decoder of the receiving device. The speech decoder may correspond to the decoder 134 of the second device 122. The second data may include only a plurality of primary copy, which was encoded by the primary frame coding block 320 without including at least one partial copy.

Figure 6:
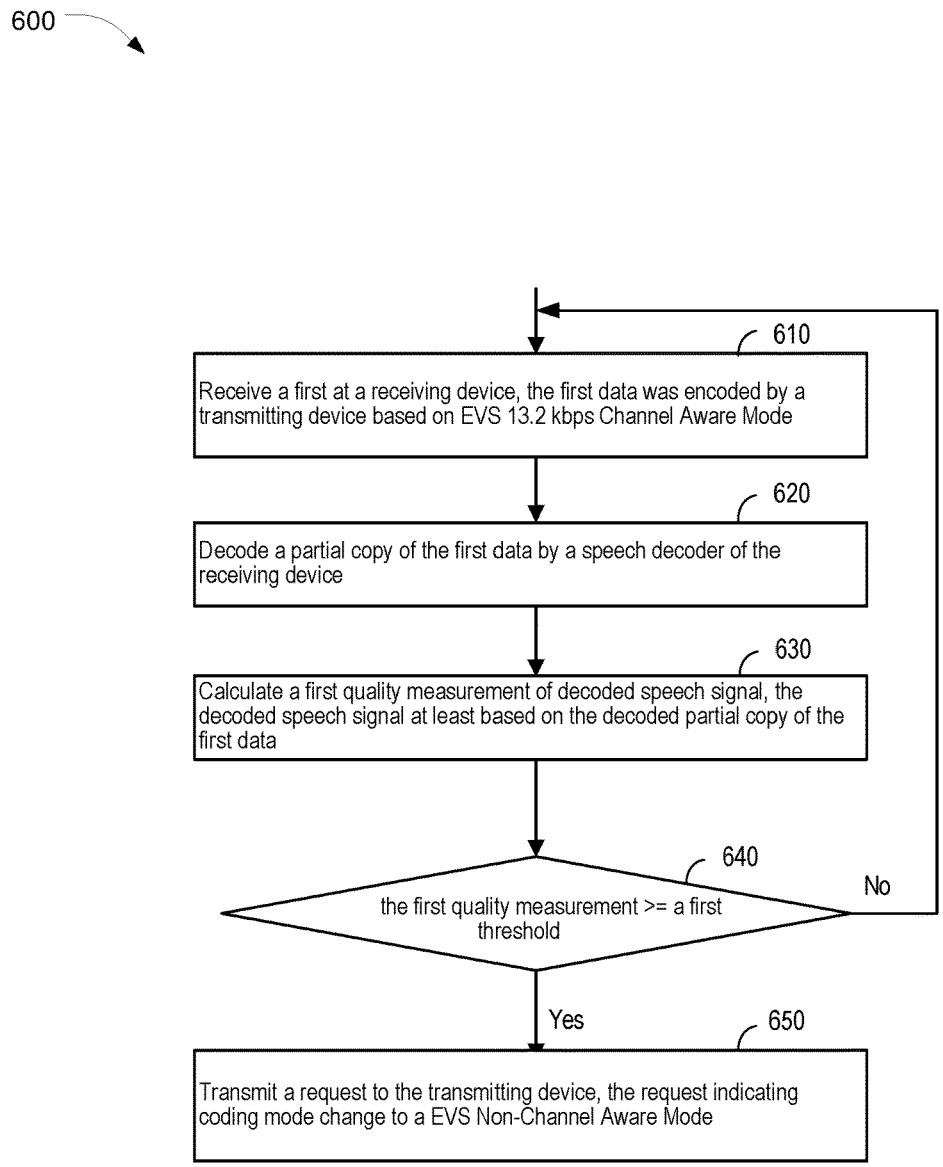
FIG. 6 is another flow chart illustrating a particular method of changing coding mode for operating EVS codec.

Referring to FIG. 6, a method 600 for switching EVS coding mode from a channel aware mode to a non-channel aware mode is disclosed. The method 600 may be a particular example of the method 500. The method 600 includes receiving a first data at a receiving device, at 610. The receiving device may correspond to the second device 122. The first data was encoded by a transmitting device (e.g., the first device 102) based on EVS 13.2 kbps channel aware mode.

The method 600 includes decoding a partial copy of the first data, by a speech decoder of the receiving device, at 620. The speech decoder may correspond to the decoder 134 of the second device 122. For example, the first data may include both a partial copy of a first frame, which was encoded by the redundant frame coding block 340, and a primary copy of a second frame, which was encoded by the primary frame coding block 320. In one implementation, the step of decoding the partial copy of the first date may be performed in response to the determination that a current frame to be decoded is not available the de-jitter buffer 132 but the partial copy for the current frame is available in the de-jitter buffer 132. The decoding of the partial copy of the first data may be performed by the redundant frame decoding block 440.

The method 600 includes calculating a first quality measurement of decoded speech signal, at 630. The decoded speech signal includes decoded samples the redundant frame decoding block 440 based on the partial copy of the first data. The analyzer 136 may calculate the first quality measurement of decoded speech signal. In one implementation, the analyzer 116 may calculate a real-time quality metric of decoded speech signal. The real-time quality metric may be measured objectively or subjectively based on the quality of the decoded audio samples. For example, the analyzer 116 may calculate quality measurement of decoded speech sample based on PEAQ or PESQ.

The method 600 includes comparing the first quality measurement with a first threshold, at 640. In some implementation, the step 640 may be performed by the analyzer 116. The analyzer 116 may compare the quality measurement with the threshold to determine whether the redundant frame coding in a channel aware mode contributes any quality improvement for decoded speech samples.

The method 600 includes transmitting a request to the transmitting device, in response to determining that the first quality measurement is greater than or equal to the first threshold, at 650. The request may be transmitted by the transmitter 128 of the second device 122 to the receiver 106 of the first device 102. The request may indicate coding mode change for the first device 102 from EVS 13.2 kbps channel aware mode to any EVS non-channel aware mode. For example, the EVS non-channel aware mode may include EVS 13.2 kbps non-channel aware mode or EVS 24.4 kbps.

Figure 7:
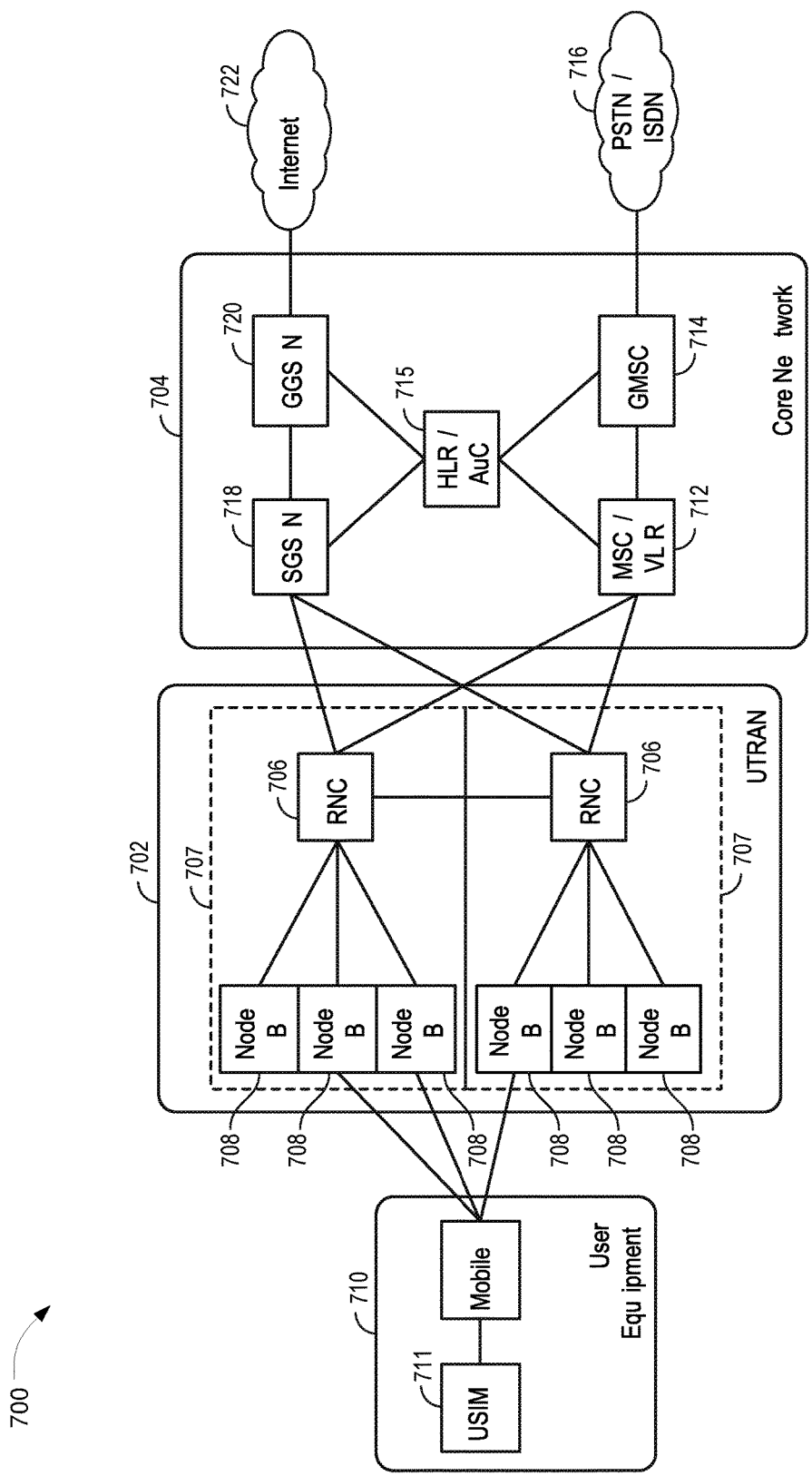
FIG. 7 is a block diagram conceptually illustrating an example of a telecommunications system based on 3GPP.

Referring to FIG. 7, a block diagram conceptually illustrating an example of a telecommunications system based on 3GPP is disclosed and generally designated 700. The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 1600 employing a W-CDMA air interface. A UMTS network includes three interacting domains: a Core Network (CN) 704, a UMTS Terrestrial Radio Access Network (UTRAN) 702, and User Equipment (UE) 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a Medium Access Control (MAC) layer. Further, communication between a UE 710 and an RNC 706 by way of a respective Node B 708 may be considered as including a Radio Resource Control (RRC) layer. In the instant specification, the PHY layer may be considered layer 1; the MAC layer may be considered layer 2; and the RRC layer may be considered layer 3.

The geographic region covered by the RNS 707 may be divided into multiple cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile Services Switching Centre (MSC), a Visitor Location Register (VLR) and a Gateway MSC. Packet-switched elements include a Serving GPRS Support Node (SGSN) and a Gateway GPRS Support Node (GGSN). In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a SGSN 718 and a GGSN 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data may be transferred between the 720 and the UEs 710 through the SGSN 718, which performs primarily the same functions in the packet-based domain as the MSC 712 performs in the circuit-switched domain.

Figure 8:
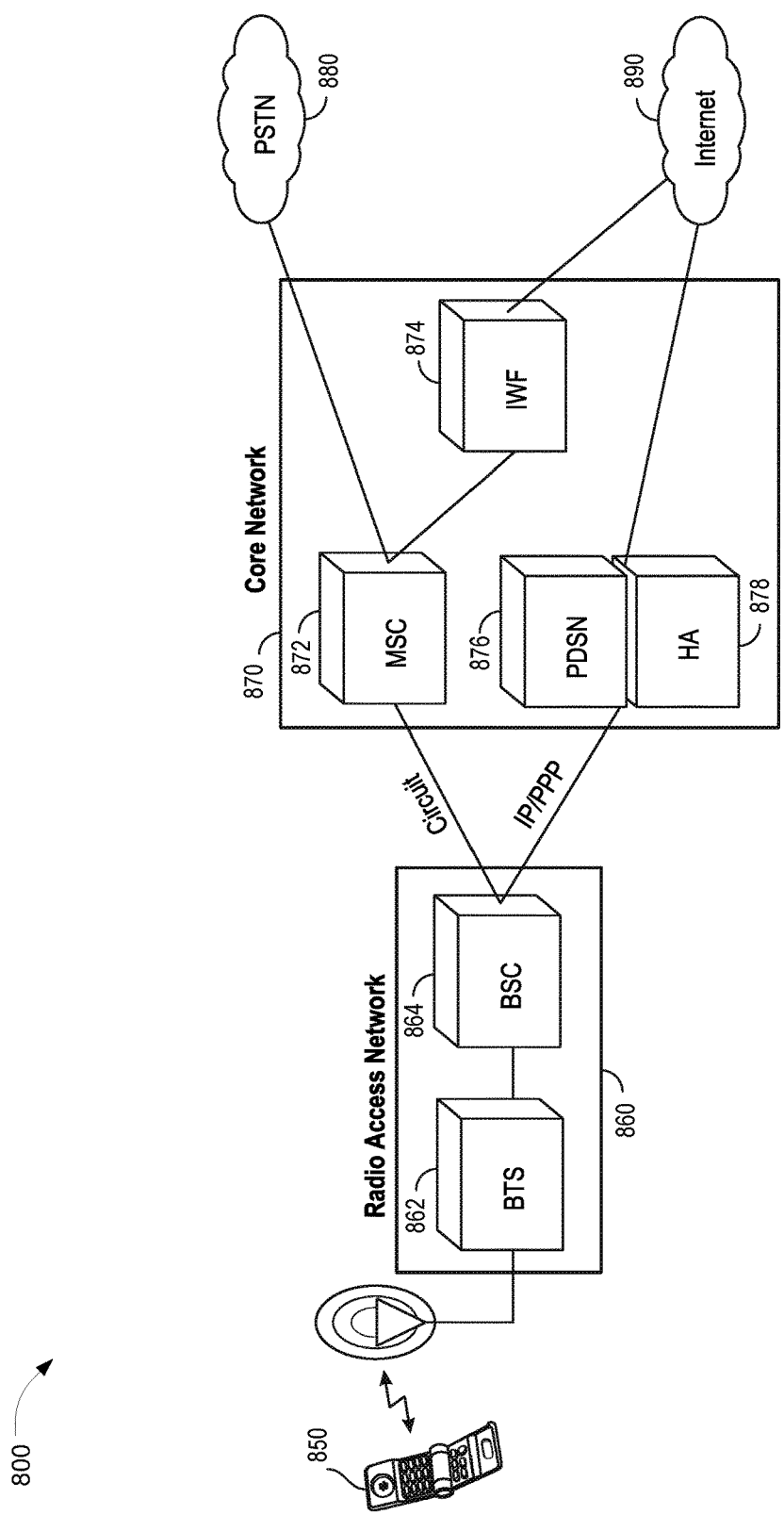
FIG. 8 is a block diagram conceptually illustrating an example of a telecommunications system based on 3GPP2.

Referring to FIG. 8, a block diagram conceptually illustrating an example of a telecommunications system based on 3GPP2 employing a cdma2000 interface is disclosed and generally designated 800. A 3GPP2 network may include three interacting domains: a UE 850 (which may also be called a Mobile Station (MS)), a Radio Access Network (RAN) 860, and a Core Network (CN) 870. In various examples, the RAN 860 provides various wireless services including telephony, video, data, messaging, broadcasts, and/or other services. The RAN 860 may include a plurality of BTSs 862, each controlled by a respective BSC 864. The CN 870 interfaces with one or more access networks, such as the RAN 860. The CN 870 may include a CS domain and a PS domain. Some of the circuit-switched elements are a Mobile Switching Center (MSC) 872 to connect to a Public Switched Telephony Network (PSTN) 880 and an Inter-Working Function (IWF) 874 to connect to a network such as the Internet 890. Packet-switched elements may include a Packet Data Serving Node (PDSN) 876 and a Home Agent (HA) 878 to connect to a network such as the Internet 890. In addition, an Authentication, Authorization, and Accounting (AAA) function (not shown) may be included in the CN 870 to perform various security and administrative functions.

Examples of a UE may include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE is commonly referred to as a mobile apparatus, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 9:
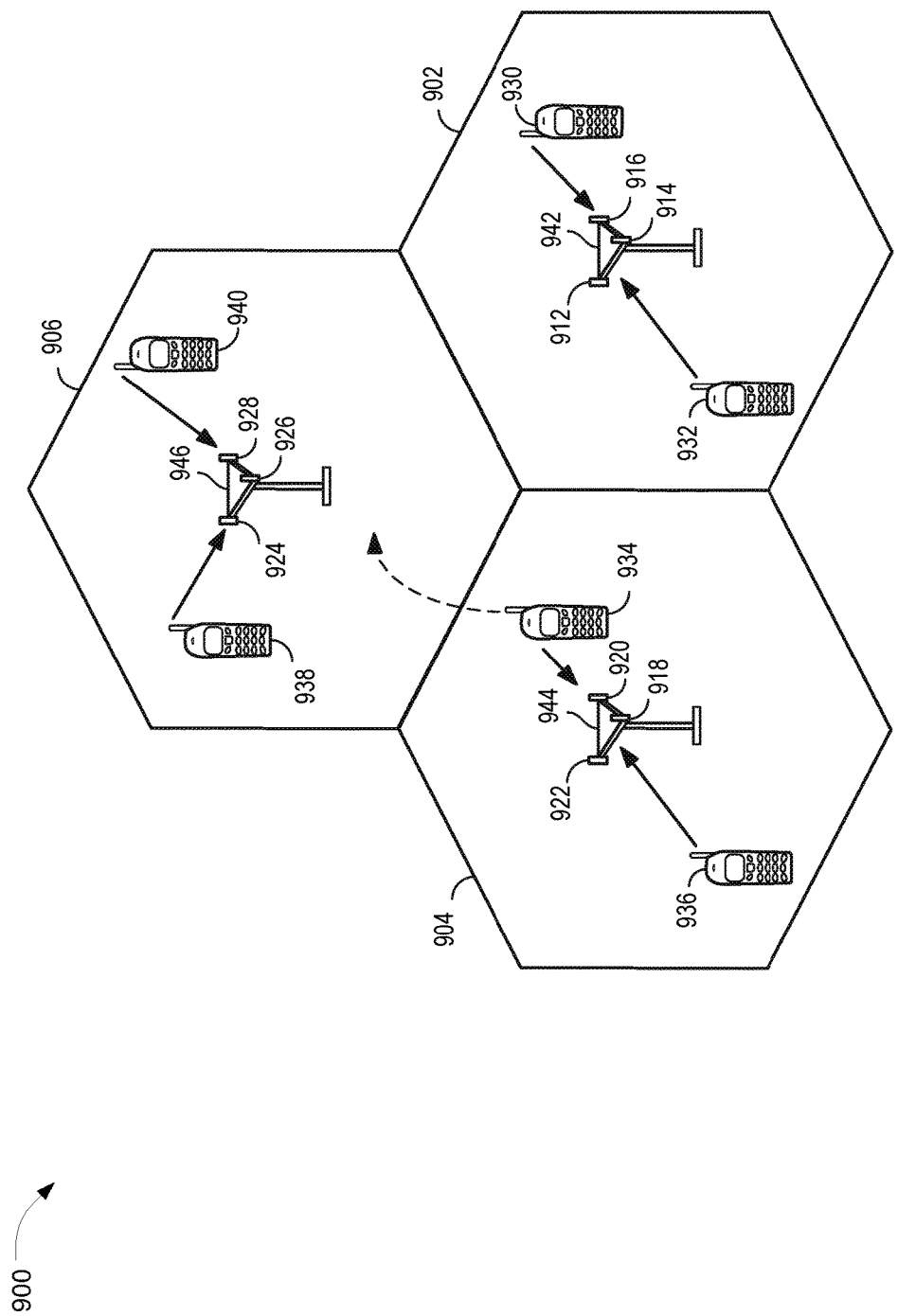
FIG. 9 is a diagram conceptually illustrating an example of an access network in a UTRAN or RAN architecture.

Referring to FIG. 9, a diagram conceptually illustrating an example of an access network in a UTRAN or RAN architecture is illustrated and generally designated 900. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices (e.g., UEs), which may be in communication with one or more sectors of each cell 902, 904 or 906. For example, UEs 930 and 932 may be in communication with base station 942, UEs 934 and 936 may be in communication with base station 944, and UEs 938 and 940 can be in communication with base station 946. References to a base station made herein may include the node B 708 of FIG. 7 and/or the BTS 862 of FIG. 8.

Here, each base station 942, 944, 946 is configured to provide an access point to a CN (see FIGS. 7-8) for all the UEs 930, 932, 934, 936, 938, 940 in the respective cells 902, 904, and 906. As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the base stations corresponding to the respective cells, at a RNC 706 or Base Station Controller (BSC) 864 (see FIGS. 7-8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 1700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3GPP2 as part of the cdma2000 family of standards and employs CDMA to provide broadband Internet access to user equipment (e.g., mobile stations). The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, Long-Term Evolution (LTE), LTE Advanced, and GSM are described in documents from the 3GPP organization. cdma2000 and UMB are described in documents from the 3GPP2 organization. The actual wireless communication standard and the multiple access technology employed will depend on the specific application and the overall design constraints imposed on the system.

Figure 10:
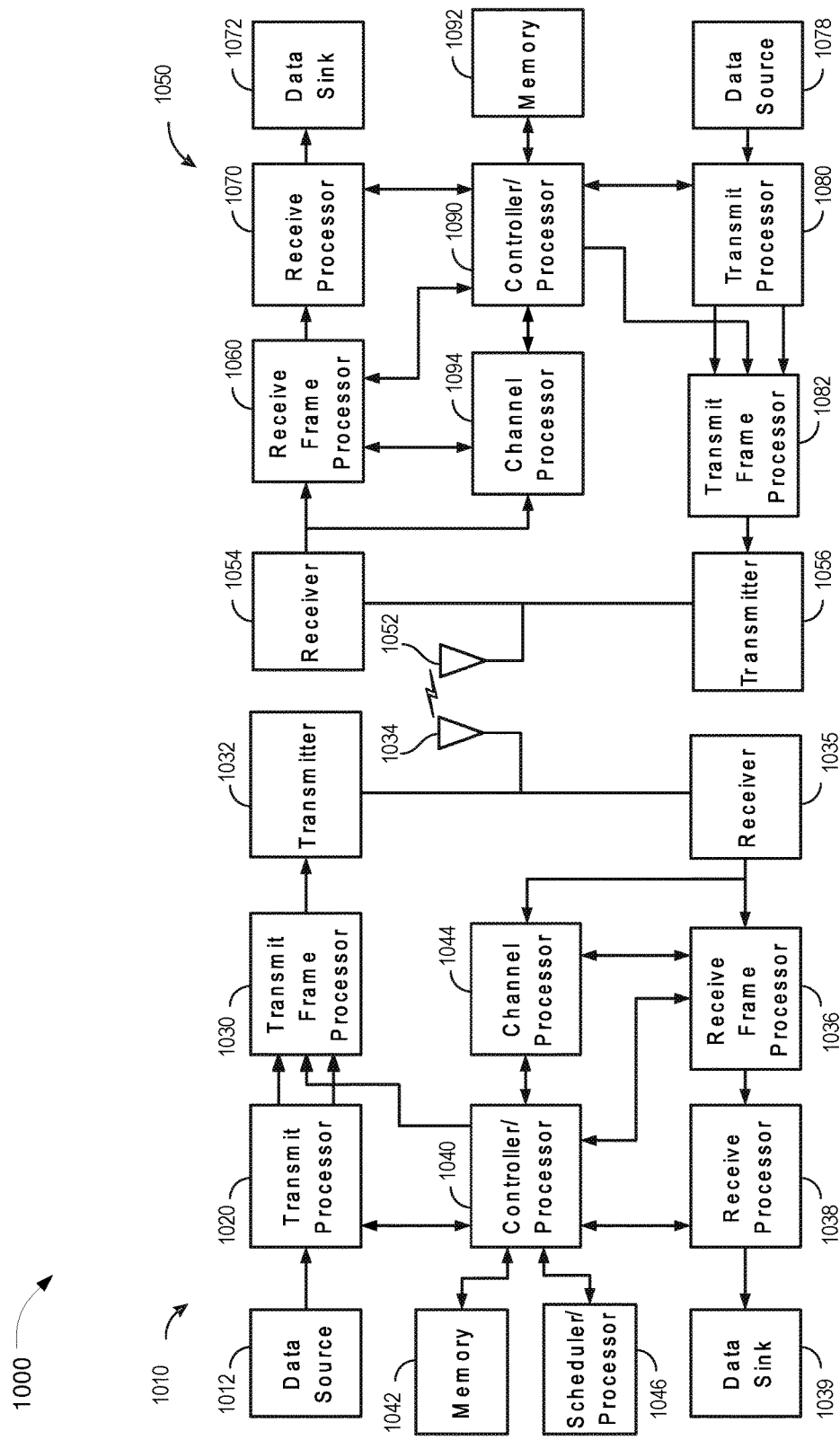
FIG. 10 is a block diagram of a base station (BS) in communication with a UE.

Referring to FIG. 10, a block diagram of a base station 1010 in communication with a UE 1050 is disclosed and generally designated 1000. The base station 1010 may be the Node B 708 or the BTS 862 in FIGS. 7-8, and the UE 1050 may be the UE 710, 850 in FIGS. 7-8. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the base station 1010. More specifically, the receive processor 1070 descrambles and despreads the symbols, and then determines the most likely signal constellation points transmitted by the base station 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the base station 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the base station 1010 or from feedback contained in the midamble transmitted by the base station 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the base station 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor 1040, respectively. If some of the frames were unsuccessfully decoded by the receive processor, the controller/processor 1040 may also use an ACK and/or NACK protocol to support retransmission requests for those frames.

The controller/processors 1040 and 1090 may be used to direct the operation at the base station 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the base station 1010 and the UE 1050, respectively. A scheduler/processor 1046 at the base station 1010 may be used to allocate resources to the UEs and schedule downlink and/or uplink transmissions for the UEs.

In various examples, wireless networks with EVS coverage may be handed over to a wireless network without EVS coverage, i.e., a non-native EVS system. For example, a UE within a LTE coverage may be handed over to another coverage, e.g., 3GPP2 coverage, without EVS. A transcoder may be used to enable compatibility for EVS coverage with possible increase in delay and decrease in audio quality due to the need for transcoding between different formats.

Figure 11:
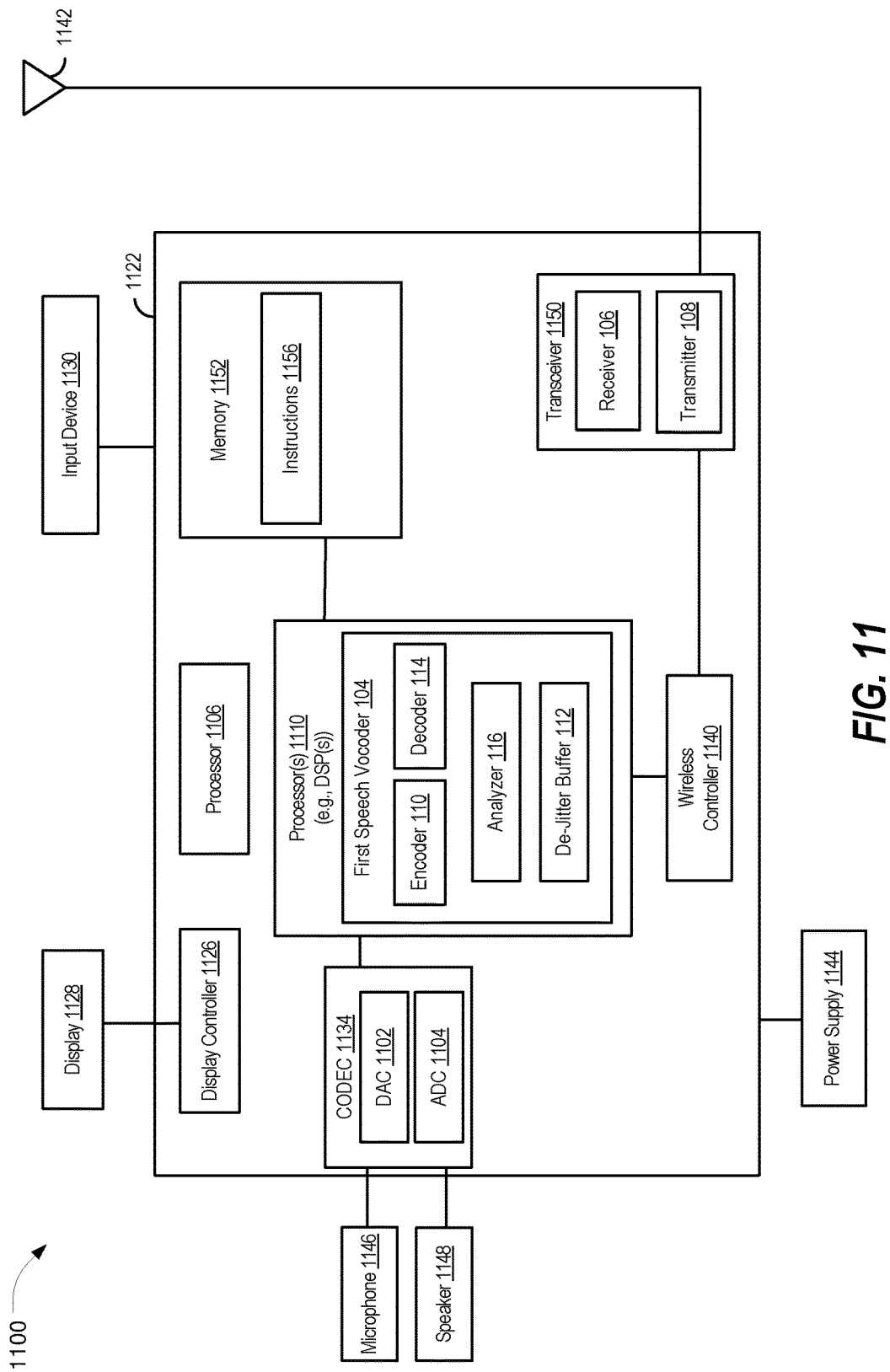
FIG. 11 is a block diagram of a particular illustrative example of a device that is operable to switch coding mode.

Referring to FIG. 11, a block diagram of a particular illustrative implementation of a device (e.g., a wireless communication device) for smart coding mode switch is depicted and generally designated 1100. In various implementations, the device 1100 may have more or fewer components than illustrated in FIG. 11. In an illustrative implementation, the device 1100 may correspond to one or more of the first device 102, the second device 122 of FIG. 1, and the UE 850 of FIG. 8. In an illustrative implementation, the device 1100 may operate according to one or more of the systems or methods described with reference to FIGS. 1-10.

In a particular implementation, the device 1100 includes a processor 1106 (e.g., a central processing unit (CPU)). The device 1100 may include one or more additional processors 1110 (e.g., one or more digital signal processors (DSPs)). The processors 1110 may include the first speech vocoder 104. In an alternate implementation, the first speech vocoder 104 may be included in a different type of processor, such as a CPU (e.g., the processor 1106).

The device 1100 may include the memory 1152 and a CODEC 1134. The memory 1152 may include instructions 1156 that are executable by the processor 1110. The device 1100 may include a wireless controller 1140 coupled, via a transceiver 1150, to an antenna 1142. In a particular implementation, the transceiver 1150 may include the receiver 106, the transmitter 108, or both, of FIG. 1. As a further example, the antenna 1142 may receive incoming packets corresponding to a sequence of packets sent by another device via a network. The received packets may correspond to a sequence of frames of a user speech signal.

The device 1100 may include a display 1128 coupled to a display controller 1126. The speaker 1148, the microphone 1146, or both, may be coupled to the CODEC 1134. The CODEC 1134 may include a digital-to-analog converter 1102 and an analog-to-digital converter 1104. In a particular implementation, the CODEC 1134 may receive analog signals from the microphone 1146, convert the analog signals to digital signals using the analog-to-digital converter 1104, and provide the digital signals to the first speech vocoder 104. The first speech vocoder 104 may process the digital signals. In a particular implementation, the first speech vocoder 104 may provide digital signals to the CODEC 1134. The CODEC 1134 may convert the digital signals to analog signals using the digital-to-analog converter 1102 and may provide the analog signals to the speaker 1148.

The first speech vocoder 104 may include the encoder 110, the decoder 114, the analyzer 116, the de-jitter buffer 112. The decoder 114, the analyzer 116, and the de-jitter buffer 112 may be used to implement a hardware that performs smart coding mode switch as described herein. Alternatively, or in addition, a software implementation (or combined software/hardware implementation) may be used. For example, the memory 1152 may include instructions 1156 executable by the processors 1110 or other processing unit of the device 1100 (e.g., the processor 1106, the CODEC 1134, or both) to perform the method 500 of FIG. 5 or the method 600 of FIG. 6.

The device 1100 may be included in a system-in-package or system-on-chip device 1122. In a particular implementation, the memory 1152, the processor 1106, the processors 1110, the display controller 1126, the CODEC 1134, and the wireless controller 1140 may be included in a system-in-package or system-on-chip device 1122. In a particular implementation, an input device 1130 and a power supply 1144 are coupled to the system-on-chip device 1122. Moreover, as illustrated in FIG. 11, the display 1128, the input device 1130, the speaker 1148, the microphone 1146, the antenna 1142, and the power supply 1344 are external to the system-on-chip device 1122. In a particular implementation, each of the display 1128, the input device 1130, the speaker 1148, the microphone 1146, the antenna 1142, and the power supply 1144 may be coupled to a component of the system-on-chip device 1122, such as an interface or a controller.

In an illustrative implementation, the processors 1110 may be operable to perform all or a portion of the methods or operations described with reference to FIGS. 1-10. As an illustrative example, the processors 1110 may be configured to execute software (e.g., a program of one or more instructions 1156) stored in the memory 1152. For example, the processors 1110 may be configured to operate in accordance with the method 500 of FIG. 5, the method 600 of FIG. 6, or a combination thereof. To illustrate, the processors 1110 may be configured to execute the instructions 1156 that cause the processors 1110 to perform the operations of receiving a first data at a de-jitter buffer 112. The first data may be encoded by a transmitting device (e.g., the first device 102) based on a first coding mode indicating both primary frame encoding and redundant frame encoding. The processor may also perform the operations of decoding the first data by the decoder 114. The first data may include both a partial copy of a first frame and a primary copy of a second frame.

The processor may also perform the operations of determining whether a condition for coding mode change is satisfied. The condition to trigger coding mode change may be based on statistical information indicating the number of the received partial copies decoded by redundant frame decoding block, a real-time quality metric of decoded speech signal, or information from another layer.

The processor may also perform the operations of transmitting a request to the transmitting device, in response to determining that the condition is satisfied. The request may indicate coding mode change from the first coding mode to a second coding mode, which corresponds to encoding by only primary frame encoding scheme without the use of redundant frame encoding scheme. The processor may also perform the operations of receiving a second data at the de-jitter buffer of the receiving device, where the second data was encoded by the transmitting device based on the second coding mode.

In conjunction with the described implementations, an apparatus may include means for receiving a first data. For example, the means for receiving the first data may include the receiver 106, the transceiver 1150, the de-jitter buffer 112, one or more other devices, circuits, or modules. The first data may be encoded by a transmitting device based on a first coding mode indicating both primary frame encoding and redundant frame encoding. The apparatus may also include means for decoding the first data, at the receiving device. For example, the means for decoding the first data may include the decoder 114, the first speech vocoder 104, the processors 1106 1110, one or more other devices, circuits, or modules. The first data may include a partial copy of a first frame of the audio signal and a primary copy of a second frame of the audio signal.

The apparatus may also include means for determining whether a condition for coding mode change is satisfied. For example, the means for determining the condition for coding mode change may include the analyzer 116, the first speech vocoder 104, the processors 1106 1110, one or more other devices, circuits, or modules. The apparatus may also include means for transmitting a request to the transmitting device in response to determining that the condition is satisfied. For example, the means for transmitting the request may include the transmitter 108, the transceiver 1150, one or more other devices, circuits, or modules. The request may indicate coding mode change to a second coding mode corresponding to primary frame encoding without redundant frame encoding.

The apparatus may also include means for receiving a second at the receiving device. For example, the means for receiving the first data may include the receiver 106, the transceiver 1150, the de-jitter buffer 112, one or more other devices, circuits, or modules. The second data maybe encoded by the transmitting device based on the second coding mode. The apparatus may also include means for decoding the second data. For example, the means for decoding the second data may include the decoder 114, the first speech vocoder 104, the processors 1106 1110, one or more other devices, circuits, or modules. The second data may include a primary copy of a third frame of the audio signal.

One or more of the disclosed aspects may be implemented in a system or an apparatus, such as the device 1100, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1100 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, any other device that includes a processor or that stores or retrieves data or computer instructions, or a combination thereof. As another illustrative, non-limiting example, the system or the apparatus may include remote units, such as handheld personal communication systems (PCS) units, portable data units such as GPS enabled devices, meter reading equipment, or any other device that includes a processor or that stores or retrieves data or computer instructions, or any combination thereof.

Although one or more of FIGS. 1-11 may illustrate systems, apparatuses, and/or methods according to the teachings of the disclosure, the disclosure is not limited to these illustrated systems, apparatuses, and/or methods. One or more functions or components of any of FIGS. 1-11 as illustrated or described herein may be combined with one or more other portions of another function or component of FIGS. 1-11. Accordingly, no single example described herein should be construed as limiting and examples of the disclosure may be suitably combined without departing from the teachings of the disclosure. As an example, one or more of the methods of FIGS. 5-6, individually or in combination, may be performed by the processors 1110 of FIG. 11. To illustrate, one or more operations described with reference to the FIGS. 5-6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of communicating an audio signal, comprising:
   receiving a first data at a de-jitter buffer of a receiving device, wherein the first data was encoded by a transmitting device based on a first coding mode, and wherein the first coding mode indicates both primary frame encoding and redundant frame encoding;
   decoding the first data, by a speech decoder of the receiving device, the first data including a partial copy of a first frame of the audio signal and a primary copy of a second frame of the audio signal;
   determining, at the receiving device, whether a condition for coding mode change is satisfied;
   in response to determining that the condition is satisfied, transmitting a request to the transmitting device, the request indicating coding mode change to a second coding mode, wherein the second coding mode indicates primary frame encoding without redundant frame encoding;
   receiving, a second data at the de-jitter buffer of the receiving device, wherein the second data was encoded by the transmitting device based on the second coding mode; and
   decoding the second data, by the speech decoder of the receiving device, the second data including a primary copy of a third frame of the audio signal.

2. The method of claim 1, wherein decoding the first data comprises decoding at least one among the partial copy of the first frame of the audio signal and the primary copy of the second frame of the audio signal.

3. The method of claim 2, further comprising:
   detecting a particular frame was missing in the de-jitter buffer of the receiving device; and
   in response to detecting the particular frame was missing in the de-jitter buffer of the receiving device, decoding the partial copy of the first frame of the audio signal.

4. The method of claim 1, wherein determining whether the condition for coding mode change is satisfied is based on information indicating statistical use of a plurality of partial copies by the speech decoder.

5. The method of claim 1, wherein determining whether the condition for coding mode change is satisfied comprising:
   calculating a first quality measurement of decoded speech signal, wherein the decoded speech signal includes a portion of speech signal decoded from at least a partial copy of a frame; and
   comparing the first quality measurement with a first threshold.

6. The method of claim 1, wherein determining whether the condition for coding mode change is satisfied comprising receiving an indication through error concealment mechanism.

7. The method of claim 1, wherein the first coding mode corresponds to a channel aware mode and the second coding mode corresponds to non-channel aware mode.

8. The method of claim 7, wherein the first coding mode corresponds to a first bitrate and the second coding mode corresponds to a second bitrate, wherein the second bitrate is higher than the first bitrate.

9. The method of claim 7, wherein the first coding mode corresponds to Enhanced Voice Services (EVS) channel aware mode and the second coding mode corresponds to EVS non-channel aware mode.

10. An apparatus for communicating an audio signal, comprising:
    a de-jitter buffer configured to:
       receive a first data, wherein the first data was encoded by a transmitting device based on a first coding mode, and wherein the first coding mode indicates both primary frame encoding and redundant frame encoding; and
       receive a second data, wherein the second data was encoded by the transmitting device based on a second coding mode;
    an analyzer, coupled to the de-jitter buffer, configured to determine whether a condition for coding mode change is satisfied;
    a transmitter configured to transmit, in response to determining that the condition is satisfied by the analyzer, a request to the transmitting device, the request indicating coding mode change to the second coding mode, wherein the second coding mode indicates primary frame encoding without redundant frame encoding; and
    a speech decoder, coupled to the de-jitter buffer, configured to:
       decode the first data, the first data including a partial copy of a first frame of the audio signal and a primary copy of a second frame of the audio signal; and
       decode the second data, the second data including a primary copy of a third frame of the audio signal.

11. The apparatus of claim 10, wherein the speech decoder is further configured to decode the first data based on decoding at least one among the partial copy of the first frame of the audio signal and the primary copy of the second frame of the audio signal.

12. The apparatus of claim 11, wherein the analyzer is further configured to detect a particular frame was missing in the de-jitter buffer and wherein the speech decoder, in response to detecting the particular frame was missing in the de-jitter buffer, is configured to decode the partial copy of the first frame of the audio signal.

13. The apparatus of claim 10, wherein determining whether the condition for coding mode change is satisfied is based on information indicating statistical use of a plurality of partial copies by the speech decoder.

14. The apparatus of claim 10, wherein the analyzer is further configured to:
    calculate a first quality measurement of decoded speech signal, wherein the decoded speech signal includes a portion of speech signal decoded from at least a partial copy of a frame; and compare the first quality measurement with a first threshold.

15. The apparatus of claim 10, wherein the analyzer is further configured to receive an indication through error concealment mechanism.

16. The apparatus of claim 10, wherein the first coding mode corresponds to a channel aware mode and the second coding mode corresponds to non-channel aware mode.

17. The apparatus of claim 16, wherein the first coding mode corresponds to a first bitrate and the second coding mode corresponds to a second bitrate, wherein the second bitrate is higher than the first bitrate.

18. The apparatus of claim 16, wherein the first coding mode corresponds to EVS channel aware mode and the second coding mode corresponds to EVS non-channel aware mode.

19. A computer-readable storage device storing instructions that, when executed by a processor, cause the processor to perform operations comprising:
receiving a first data at a de-jitter buffer, wherein the first data was encoded by a transmitting device based on a first coding mode, and wherein the first coding mode indicates both primary frame encoding and redundant frame encoding;
decoding the first data, by a speech decoder, the first data including a partial copy of a first frame of an audio signal and a primary copy of a second frame of the audio signal;
determining whether a condition for coding mode change is satisfied;
in response to determining that the condition is satisfied, transmitting a request to the transmitting device, the request indicating coding mode change to a second coding mode, wherein the second coding mode indicates primary frame encoding without redundant frame encoding;
receiving, a second data at the de-jitter buffer, wherein the second data was encoded by the transmitting device based on the second coding mode; and
decoding the second data, by the speech decoder, the second data including a primary copy of a third frame of the audio signal.

20. The computer-readable storage device of claim 19, wherein the first coding mode corresponds to a channel aware mode and the second coding mode corresponds to non-channel aware mode.

21. The computer-readable storage device of claim 19, wherein the first coding mode corresponds to a first bitrate and the second coding mode corresponds to a second bitrate, wherein the second bitrate is higher than the first bitrate.

22. An apparatus for communicating an audio signal, comprising:
means for receiving a first data at a receiving device, wherein the first data was encoded by a transmitting device based on a first coding mode, and wherein the first coding mode indicates both primary frame encoding and redundant frame encoding;
means for decoding, at the receiving device, the first data, the first data including a partial copy of a first frame of the audio signal and a primary copy of a second frame of the audio signal;
means for determining, at the receiving device, whether a condition for coding mode change is satisfied;
in response to determining that the condition is satisfied, means for transmitting a request to the transmitting device, the request indicating coding mode change to a second coding mode, wherein the second coding mode indicates primary frame encoding without redundant frame encoding;
means for receiving, a second data at the receiving device, wherein the second data was encoded by the transmitting device based on the second coding mode; and
means for decoding the second data, at the receiving device, the second data including a primary copy of a third frame of the audio signal.

23. The apparatus of claim 22, wherein the means for decoding the first data comprises means for decoding at least one among the partial copy of the first frame of the audio signal and the primary copy of the second frame of the audio signal.

24. The apparatus of claim 23, further comprising:
means for detecting a particular frame was missing in a de-jitter buffer of the receiving device; and
in response to detecting the particular frame was missing in the de-jitter buffer of the receiving device, means for decoding the partial copy of the first frame of the audio signal.

25. The apparatus of claim 22, wherein the means for determining whether the condition for coding mode change is satisfied is based on information indicating statistical use of a plurality of partial copies by a speech decoder.

26. The apparatus of claim 22, wherein the means for determining whether the condition for coding mode change is satisfied comprising:
means for calculating a first quality measurement of decoded speech signal, wherein the decoded speech signal includes a portion of speech signal decoded from at least a partial copy of a frame; and
means for comparing the first quality measurement with a first threshold.

27. The apparatus of claim 22, wherein the means for determining whether the condition for coding mode change is satisfied comprising means for receiving an indication through error concealment mechanism.

28. The apparatus of claim 22, wherein the first coding mode corresponds to a channel aware mode and the second coding mode corresponds to non-channel aware mode.

29. The apparatus of claim 28, wherein the first coding mode corresponds to a first bitrate and the second coding mode corresponds to a second bitrate, wherein the second bitrate is higher than the first bitrate.

30. The apparatus of claim 28, wherein the first coding mode corresponds to EVS channel aware mode and the second coding mode corresponds to EVS non-channel aware mode.

* * * * *